US008370851B2

(12) United States Patent
Srinivasan et al.

(10) Patent No.: US 8,370,851 B2
(45) Date of Patent: Feb. 5, 2013

(54) CONVERSATIONAL PARALLELISM FOR MESSAGE PROCESSING

(75) Inventors: Ashok Srinivasan, Woodinville, WA (US); Michael Merz, Redmond, WA (US); Rohit Kapoor, Seattle, WA (US); Vinod Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 12/135,104

(22) Filed: Jun. 6, 2008

(65) Prior Publication Data

US 2009/0306999 A1 Dec. 10, 2009

(51) Int. Cl.
*G06Q 10/00* (2012.01)
(52) U.S. Cl. ........ 719/314; 719/313; 718/100; 718/102; 718/104
(58) Field of Classification Search .................. None
See application file for complete search history.

(56) References Cited

U.S. PATENT DOCUMENTS

| | | | | |
|---|---|---|---|---|
| 5,675,771 A * | 10/1997 | Curley et al. | ............... | 703/23 |
| 5,699,523 A * | 12/1997 | Li et al. | .................. | 709/238 |
| 5,828,881 A * | 10/1998 | Wang | .................. | 719/314 |
| 6,256,676 B1 | 7/2001 | Taylor et al. | | |
| 6,954,757 B2 | 10/2005 | Zargham et al. | | |
| 7,249,157 B2 | 7/2007 | Stewart et al. | | |
| 2002/0147645 A1* | 10/2002 | Alao et al. | .................. | 705/14 |
| 2004/0117435 A1 | 6/2004 | Rossmanith et al. | | |
| 2004/0203670 A1* | 10/2004 | King et al. | .................. | 455/414.3 |
| 2005/0289198 A1* | 12/2005 | Todd | .................. | 707/204 |
| 2006/0010195 A1 | 1/2006 | Mamou et al. | | |
| 2006/0101473 A1* | 5/2006 | Taylor et al. | .................. | 719/314 |
| 2007/0198437 A1 | 8/2007 | Eisner et al. | | |
| 2007/0220148 A1 | 9/2007 | Ganesan et al. | | |
| 2007/0244971 A1 | 10/2007 | Massey | | |

OTHER PUBLICATIONS

"Informatica the data integration Company—the Foundation of a Robust Enterprise Architecture," © 2008 Informatica Corporation, 2 pages.
"PeopleSoft Integration Broker," PeopleSoft Technology Whitepaper, May 2003, 11 pages, http://www.peoplesoft.com/media/en/pdf/business_person_guide_integration_broker.pdf [last accessed Nov. 6, 2008].
Scott, Mark ".Net Developer's Journal—Getting the Message with SQL Server 2005 Service Broker," Copyright © 1994-2008, 4 pages, http://dotnet.sys-con.com/read/45911.htm [last accessed Nov. 6, 2008].

* cited by examiner

*Primary Examiner* — H. S. Sough
*Assistant Examiner* — Umut Onat
(74) *Attorney, Agent, or Firm* — Perkins Coie LLP

(57) ABSTRACT

A system and method for processing messages in an enterprise resource planning (ERP) system is provided. A processing service generates a snapshot of a message queue, which contains a plurality of messages to be processed by the ERP system. Each message has an associated conversation, identified by a unique combination of an endpoint, channel, and subconversation identifier. For each conversation, the processing service determines whether messages of the conversation are to be processed in serial or in parallel, based on the subconversation identifier of the conversation. When the messages of the conversation are to be processed in serial, a task is created to process the messages serially. Alternatively, when the messages of the conversation are to be processed in parallel, a task is created for each of the messages. The messages of each task are processed serially by the task, while each task is executed in parallel with other tasks.

15 Claims, 13 Drawing Sheets

| Channel | Parallel processing enabled |
|---|---|
| 1 | full |
| 2 | full |
| 3 | full |
| 4 | none |

*FIG. 2*

| 1201 | 1202 | 1203 | 1204 | 1205 | 1206 | 1207 |
|---|---|---|---|---|---|---|
| Channel | Source Endpoint | Sub-conversation Identifier | User Identifier | Message | Time | Conversation |
| 1 | endpoint 1 | 1 | user 1 | | T1 | 1 |
| 1 | endpoint 1 | 1 | user 1 | | T2 | 1 |
| 1 | endpoint 1 | 1 | user 2 | | T3 | 1 |
| 1 | endpoint 1 | 1 | user 1 | | T4 | 1 |
| 1 | endpoint 1 | 1 | user 1 | | T5 | 1 |
| 1 | endpoint 1 | 1 | user 1 | | T6 | 1 |
| 1 | endpoint 1 | 1 | user 3 | | T7 | 1 |
| 1 | endpoint 1 | 1 | user 3 | | T8 | 1 |

*FIG. 12*

CONVERSATIONAL PARALLELISM FOR MESSAGE PROCESSING

An enterprise resource planning (ERP) system integrates applications and processes of one or more businesses or organizations into a unified system. Each business or organization, subdivision of a business or organization, or application (herein collectively referred to as endpoints) may request access to one or more services of the ERP system. For example, a customer relationship management (CRM) department may request modification of a customer record, while a manufacturing department may update the status of an item of a sales order.

Each request to access a service of the ERP system may be included in a message that is transmitted by an endpoint to the ERP system. Upon receipt of the transmitted messages, the ERP system stores asynchronously transmitted messages in an inbound message queue. In addition, the ERP system generates messages to be transmitted to multiple endpoints. For example, the ERP system may send an updated copy of a customer record or a sales order to the appropriate department of the business or organization. These messages are stored by the ERP system in an outbound message queue. Periodically, a processing service retrieves messages from an ERP message queue, whether the inbound message queue or the outbound message queue, and processes the messages. Messages are traditionally processed by a processing service in serial, such as based on a time of message creation or receipt, because some messages should be processed before other messages. For example, a message that includes a request to create a sales order should be processed prior to messages that include requests to add line items to the sales order.

As performance demands on an ERP system grow, due to increasing numbers of messages to be processed, it can take longer for messages to move through a message queue. While a processing service may attempt to scale out by processing some messages in parallel, providing for message dependencies to be configured at the processing service does not correspond well to the variety of messages that are sent by different endpoints, nor does it adapt well to the changing needs of a business or organization.

SUMMARY

A system and method for processing messages in an enterprise resource planning (ERP) system is provided. A processing service generates a snapshot of a message queue, which contains a plurality of messages to be processed by the ERP system. Each message has an associated conversation, which is identified by a unique combination of an endpoint, a channel, and a subconversation identifier. For each conversation associated with a message of the snapshot, the processing service selects the messages associated with the conversation and determines whether the selected messages are to be processed in serial or in parallel, based on the subconversation identifier of the conversation. When the selected messages are to be processed in serial, the processing service creates a task to process the selected messages serially. Alternatively, when the selected messages are to be processed in parallel, the processing service creates a task for each of the selected messages. The processing service then executes each of the created tasks. The messages of each task are processed serially by the task, while each task is executed in parallel with the other tasks.

BRIEF DESCRIPTION OF THE DRAWINGS

FIG. 2 is a block diagram that illustrates a data structure that stores indications of whether parallel processing is enabled for each channel in some embodiments.

FIG. 12 is a block diagram that illustrates a snapshot of a message queue in which records include a user identifier.

DETAILED DESCRIPTION

Figure 1:
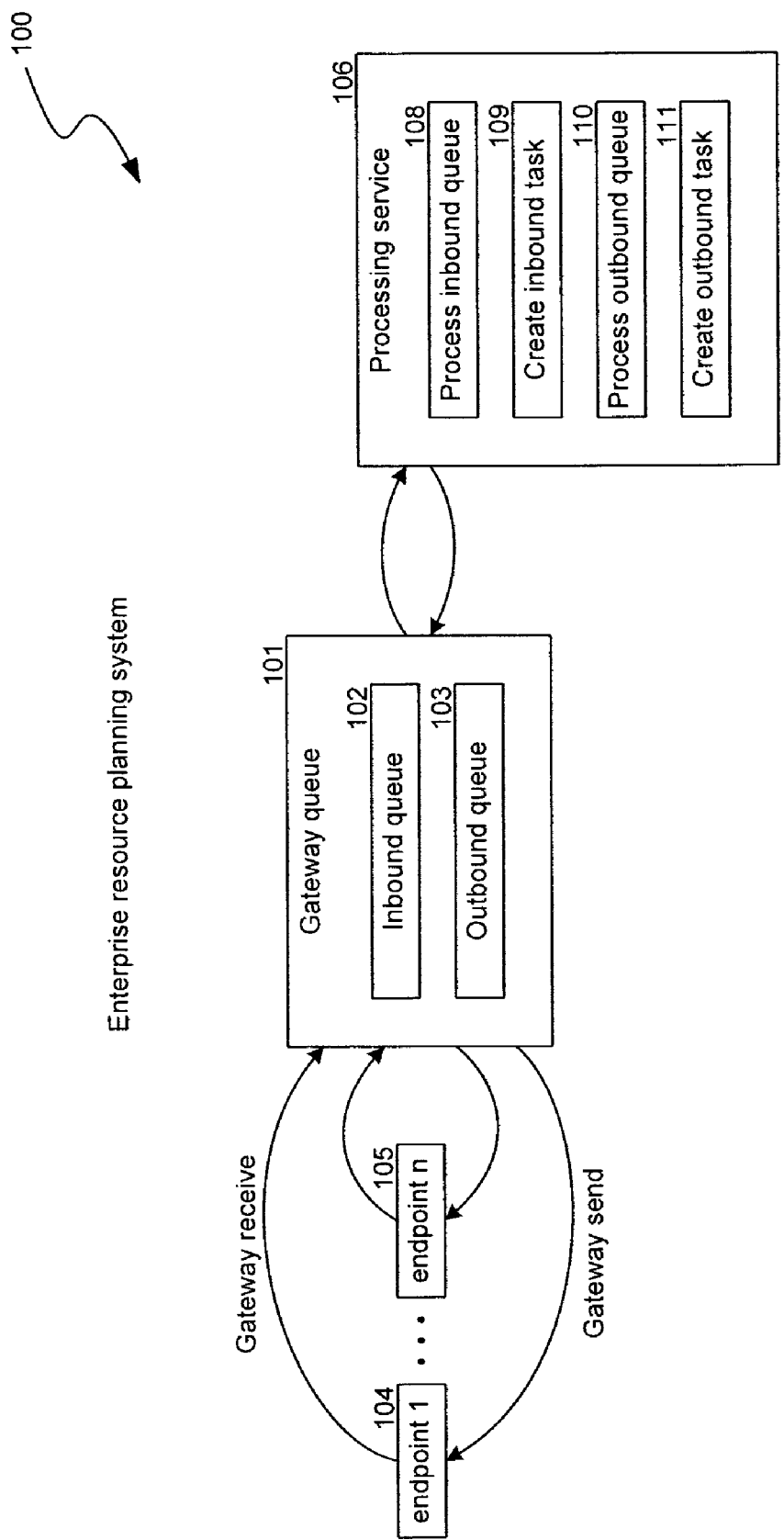
FIG. 1 is a block diagram that illustrates components of a system for processing messages in an ERP system in some embodiments.

A system and method for processing messages in an enterprise resource planning (ERP) system is provided. A processing service generates a snapshot of a message queue, which contains a plurality of messages to be processed by the ERP system. For example, messages in the queue may contain requests to create customer records, access sales orders, and a variety of other requests. Each message in the queue has an associated conversation, which is identified by a unique combination of an endpoint, a channel, and a subconversation identifier. An endpoint designates the source or the destination of the message. Examples of endpoints include applications that use MICROSOFT Message Queuing (MSMQ), file systems, and web services. A channel is a named entity that is used to specify where a message is to be sent or received from, and how the message is to be sent or received, as described below in more detail. A subconversation identifier uniquely identifies the messages of a conversation that are to be processed serially or indicates whether the messages can be processed in parallel with other messages. An example combination of endpoint, channel, and subconversation identifier may be (10, 15, 1), representing endpoint 10, channel 15, and subconversation identifier 1. Each message with this same combination would be in a single conversation. Messages with another combination, such as (10, 15, 2), would be in a separate conversation. Messages such as (10, 15, parallel) may be considered to be a conversation with a single message or a message that is not in a conversation.

For each conversation that is identified by a unique combination of an endpoint, a channel, and a subconversation identifier and that is associated with a message in the snapshot, the processing service selects the messages from the snapshot that are associated with the same conversation. The processing service determines whether the selected messages are to be processed in serial or in parallel, based on the subconversation identifier of the conversation. For example, the subconversation identifier for a conversation whose messages are to be processed serially may be a string, whereas the subconversation identifier for a conversation whose messages can be processed in parallel may be a flag that indicates the messages can be processed in parallel. When it is determined that the selected messages are to be processed in serial, the processing service creates a task for the selected messages; the task will process the selected messages serially. Alternatively, when it is determined that the selected messages are to be processed in parallel, the processing service creates a task for each of the selected messages. Once the tasks have been created, the processing service executes each of the tasks. The selected messages of each task are processed serially by the task, while each task is executed in parallel with the other tasks.

In some embodiments, the message queue to be processed is an inbound message queue. Messages in the inbound queue may have been transmitted from a variety of source endpoints, including an application that uses MSMQ, a file system, a web service, or another endpoint associated with a business or organization, or a component of the business or organization. In some embodiments, the message queue to be processed is an outbound message queue. Outbound messages may be generated by the ERP system to be transmitted to a destination endpoint, such as an application that uses MSMQ, a file system, a web service, or another endpoint associated with a business or organization, or a component of the business or organization.

In some embodiments, the processing service creates a task by first determining whether the conversation identified by the unique combination of the endpoint, the channel, and the subconversation identifier is locked. The locking mechanism ensures that messages of a conversation that is included in multiple snapshots are processed serially across snapshots. In the case of multiple processing services operating on different snapshots, locking a conversation ensures that multiple tasks are not processing messages of the same conversation at the same time, and that messages of the same conversation are processed serially. After a snapshot is taken, the processing service determines whether the conversation is locked. If it is locked, then the processing of messages of that conversation in a previous snapshot has not yet completed. When it is determined that the conversation is locked, the processing service refrains from creating a task for the selected messages until the processing of messages of that conversation in a previous snapshot completes, as indicated by the conversation being unlocked. Alternatively, when it is determined that the conversation is not locked, the processing service locks the conversation and creates a task for the selected messages. The locking mechanism also ensures that when multiple tasks are waiting on the same lock that those tasks are themselves executed serially in snapshot order.

In some embodiments, a channel of a conversation must be enabled for parallel processing by an administrator of the processing service. In such embodiments, when a subconversation identifier associated with the messages indicates that the messages are to be processed in parallel, the processing service first determines whether the channel of the conversation is enabled for parallel processing. If the channel is enabled for parallel processing, the processing service creates a task for each of the selected messages of the conversation; each of the tasks is to be processed in parallel with other tasks. Alternatively, if the channel is not enabled for parallel processing, the processing service creates a task for the selected messages of the conversation; the selected messages of the task to be processed serially. Allowing the processing service to explicitly enable parallel processing for a channel ensures that parallel processing is not improperly used for an endpoint that does not support parallel processing, such as a legacy channel, and allows the processing service to enforce serial processing of messages regardless of the preferences of an endpoint.

In some embodiments, each message has an associated time stamp, and the selected messages of the conversation are processed serially in order of their associated time stamps. For example, a time stamp may indicate a time that the message was added to the inbound or outbound message queue. Processing messages in order of their associated time stamps ensures that each message is processed after other messages, if any, on which it depends.

In some embodiments, a task created by the processing service may be a thread or a process.

FIG. 1 is a block diagram that illustrates components of a system for processing messages in an ERP system in some embodiments. A gateway queue 101 of the ERP system 100 receives messages that are transmitted from endpoints 1 104 through n 105. The ERP system adds the transmitted messages to an inbound queue 102. In addition, the ERP system generates messages that are to be transmitted to endpoints 1 104 through n 105. The generated messages are stored by the ERP system in an outbound queue 103. Periodically, one or more processing services 106 access the gateway queue 101 to process the messages in inbound queue 102 and/or outbound queue 103. Each processing service 106 includes a process inbound queue component 108, a create inbound task component 109, a process outbound queue component 110, and a create outbound task component 111. These components will be discussed in detail below.

The computing devices on which the message processing system are implemented may include a central processing unit, memory, input devices (e.g., keyboard and pointing devices), output devices (e.g., display devices), and storage devices (e.g., disk drives). The memory and storage devices are computer-readable storage media that may contain instructions that implement the message processing system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the message processing system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The message processing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

As described above, in some embodiments, the channel of a conversation must be enabled for parallel processing by an administrator of the processing service. FIG. 2 is a block diagram that illustrates a data structure that stores indications of whether parallel processing is enabled for each channel in some embodiments. Column 201 includes channels by which messages may be received by the ERP system, and column 202 includes indications of whether parallel processing is enabled for each of the channels. An indication of "full" in row 203, column 202 indicates that channel 1 has been enabled for full parallel processing. The indications in column 202 of rows 204 and 205 indicate that channels 2 and 3 have been similarly enabled. An indication of "none" in row 206, column 202 indicates that channel 4 has not been enabled for parallel processing. One skilled in the art will appreciate that other indications may be used to specify whether parallel processing has been enabled (e.g., yes/no, alphanumeric strings, symbols, etc.), and/or the degree to which parallel processing has been enabled (e.g., full, partial, none, etc.).

Figure 3:
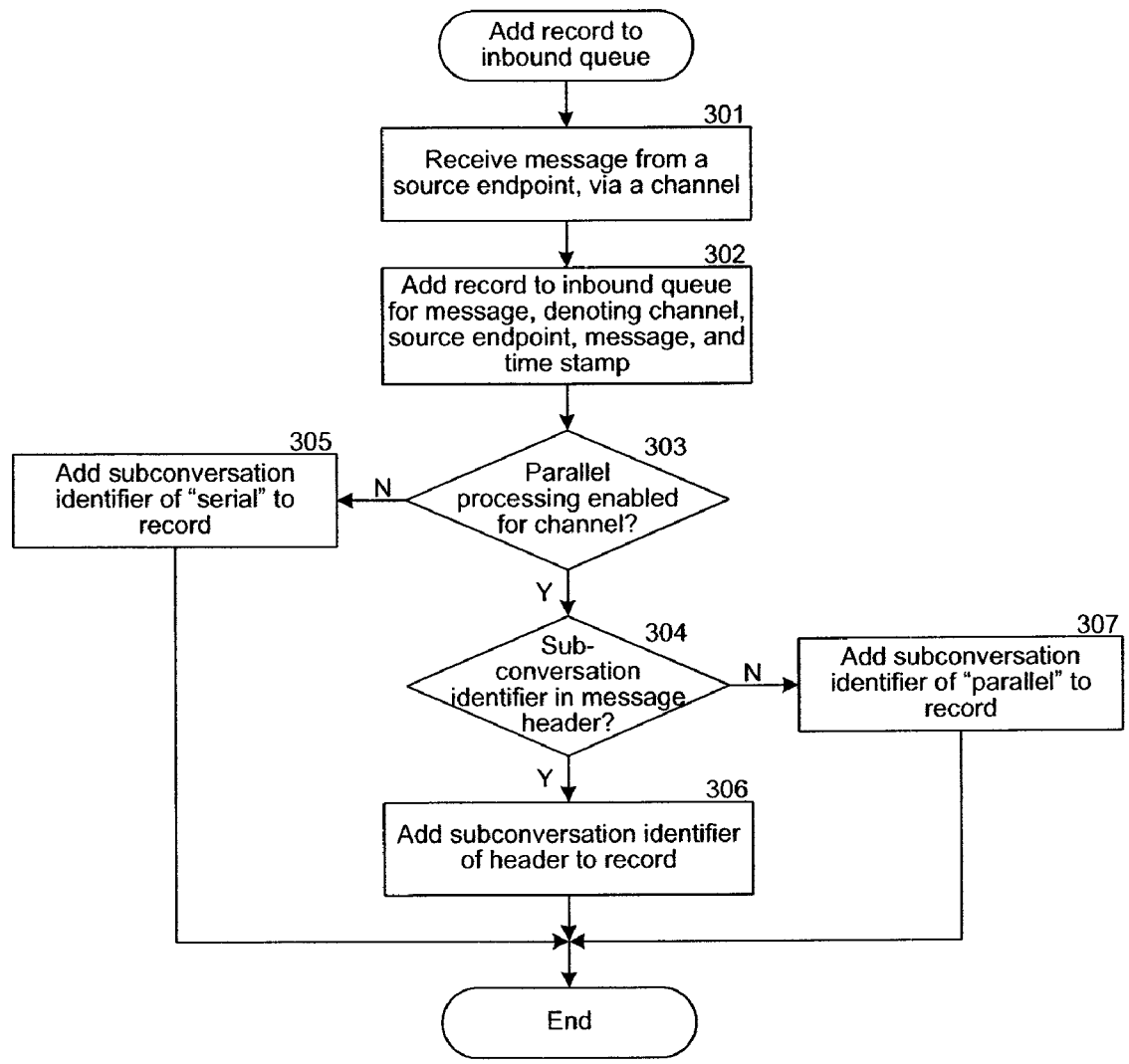
FIG. 3 is a flow diagram that illustrates a process that is used by the ERP system to add messages to the inbound queue in some embodiments.

FIG. 3 is a flow diagram that illustrates a process that is used by the ERP system to add messages to the inbound queue in some embodiments. As messages are received from a source endpoint, the ERP system adds a record to the inbound message queue for each received record. In block 301, the process receives an inbound message from a source endpoint via a channel. A channel specifies a transport adapter, a transport address, and any adapter configuration data. A transport adapter is a component that enables messages to be exchanged via a transport with an endpoint. Each supported transport has an adapter class that interfaces with that transport to enable sending and/or receiving messages through that transport. The transport is implied by the selection of the transport adapter. A transport is a specific mechanism that is used to exchange messages with an endpoint. A transport address is used to identify a send or receive location for a transport. Each transport specifies the format of its addresses. For example, a file share location may specify a transport address of \server\fileshare, and an MSMQ queue path may specify a transport address of \server\private$\receivequeue In block 302, the process adds a record to the inbound queue for the received message, denoting the source endpoint, the channel, the message contents, and a time stamp. In other embodiments, each record may contain more or less information associated with the message. In decision block 303, the process determines whether parallel processing is enabled for the channel through which the message was received. If parallel processing is enabled for the channel, the process continues to decision block 304, where the process determines whether the message contains a subconversation identifier in the header of the message. If parallel processing is not enabled for the channel, the process continues to block 305 where the process adds a subconversation identifier of "serial" to the record (e.g., (10, 15, serial)) and completes. In other embodiments, other subconversation identifiers may be used to indicate that the message is to be processed serially, including an alphanumeric string, a symbol (e.g., an asterisk), or another identifier. Returning to decision block 304, if the message contains a subconversation identifier in the header (e.g., "1" "2," "parallel," "serial," etc.), the process continues to block 306 where the subconversation identifier of the header is added to the record, else the process continues to block 307 where a subconversation identifier of "parallel" is added to the record (e.g., (10, 15, parallel)). In other embodiments, other subconversation identifiers may be used to indicate that the message is to be processed in parallel, including an alphanumeric string, a symbol, an empty string, or another identifier. Once a subconversation identifier has been added to the record, the process completes.

Figure 4:
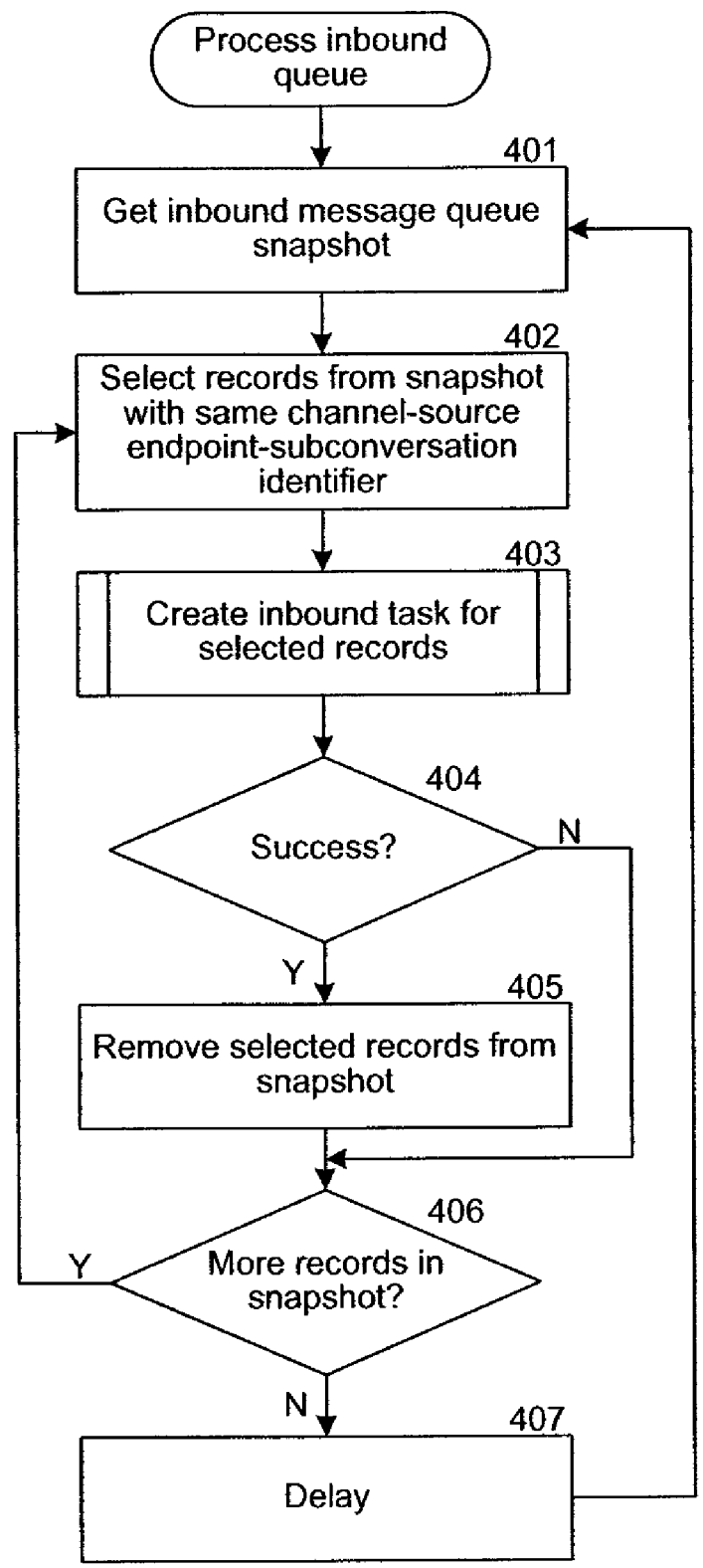
FIG. 4 is a flow diagram that illustrates the processing of the process inbound queue component of the processing service in some embodiments.
Figure 5:
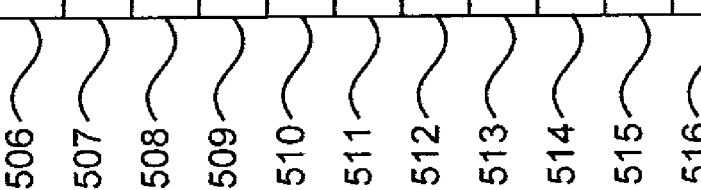
FIG. 5 is a block diagram that illustrates a snapshot of an inbound message queue that may be obtained by the process inbound queue component.

FIG. 4 is a flow diagram that illustrates the processing of the process inbound queue component of the processing service in some embodiments. Periodically, such as at a given time interval or when a predetermined number of messages have been added to the inbound message queue, the processing service invokes the process inbound queue component to process the messages in the inbound message queue. In block 401, the component gets a snapshot of an inbound message queue of the ERP system. FIG. 5 is a block diagram that illustrates a snapshot of an inbound message queue that may be obtained by the component. Column 501 contains the channel through which each message was transmitted; column 502 contains the source endpoint from which each message was transmitted; column 503 contains the subconversation identifier associated with each message; column 504 contains the contents of each message; and column 505 contains a time stamp associated with each message. Rows 506 through 516 each comprise a record of the inbound message queue.

Returning to FIG. 4, once the process inbound queue component has obtained a snapshot of the inbound message queue, for each conversation that is identified by a unique combination of a source endpoint, a channel, and a subconversation identifier, the component loops through blocks 402 through 406. In block 402, the component selects records from the snapshot that are associated with the same conversation, as identified by a unique combination of source endpoint, channel, and subconversation identifier. For example, the component may select the records comprising rows 506 and 507 of FIG. 5, which are associated with the conversation identified by endpoint 1, channel 1, and subconversation identifier 1. In block 403, the component invokes a create inbound task component for the selected records. For example, the component may invoke the create inbound task component for the records comprising rows 506 and 507. Or, the component may invoke the create inbound task component for the records comprising rows 511 and 512. Each task to be created by the create inbound task component is processed in parallel, but messages of a serial task are processed serially. In decision block 404, the component determines whether the create inbound task component successfully created a task for the selected records. If a task was successfully created, the component continues to block 405 where the selected records are removed from the snapshot, else the component continues to decision block 406. In decision block 406, the component determines whether additional records remain in the snapshot of the inbound message queue. If additional records remain, the component returns to block 402, where additional records are selected, else the component continues to bock 407 where the component waits before returning to block 401 to take another snapshot of the inbound message queue. The component may wait for a given time period or until a predetermined number of messages have been added to the inbound message queue before taking another snapshot.

Figure 6:
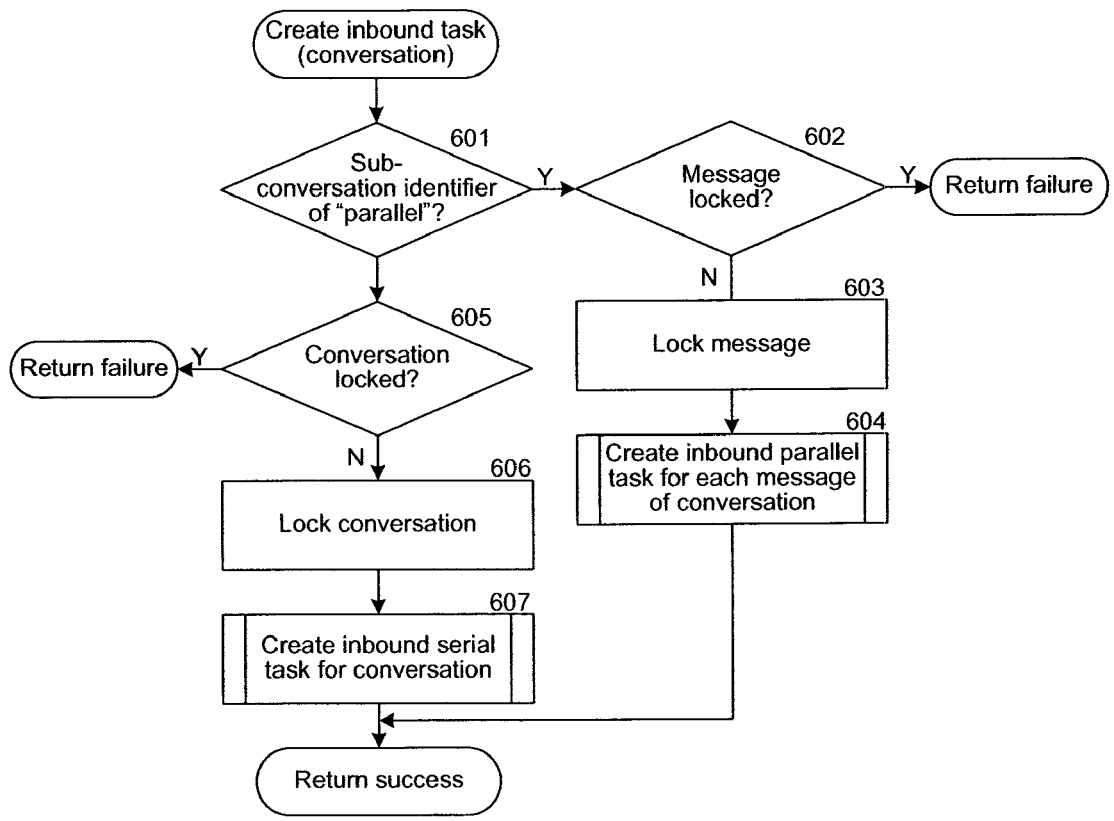
FIG. 6 is a flow diagram that illustrates the processing of the create inbound task of the processing service in some embodiments.

FIG. 6 is a flow diagram that illustrates the processing of the create inbound task component of the processing service in some embodiments. The component is passed an indication of a conversation and creates either a serial or one or more parallel tasks to process the message(s) of that conversation. In decision block 601, the component determines whether message(s) have a subconversation identifer of "parallel." For example, the processing service may have selected the messages of rows 511, 512, and 513 of FIG. 5, which are associated with the conversation identified by endpoint 1, channel 1, and subconversation identifier "parallel." If the subconversation identifier of the selected messages is "parallel," the component continues to block 602, where the component determines whether each of the messages is locked. A message may be locked, for example, if another task created from a prior snapshot, is still processing a message. Locking a message ensures that multiple tasks are not processing a message at the same time. If a message is locked, the component returns a failure, indicating that it could not create a task for the message. If the message is not locked, the component continues to decision block 603, where the component locks the message. In block 604, the component invokes a create parallel task component for each message. That is, the create parallel task component would be invoked for each of the message of row 511, the message of row 512, and the message of row 513. The message lock is passed to the create parallel task component, which unlocks the message when the task completes.

Alternatively, if at decision block 601 the component determines that the selected messages do not have a subconversation identifier of "parallel" (e.g., the selected messages have an alphanumeric subconversation identifier, a subconversation identifier of "serial," or another subconversation identifier), the component continues to block 605, where the component determines whether the conversation identified by the unique combination identified by the unique combination of source endpoint, channel, and subconversation identifier associated with the selected messages is locked. A conversation may be locked, for example, if another task created from a prior snapshot is still processing messages of the conversation. Locking a conversation ensures that multiple tasks are not processing messages of the same conversation at the same time. If the conversation is locked, the component returns a failure, indicating that it could not create a task for the conversation. if the conversation is not locked, the component continues to block 606, where the component locks the conversation identified by the unique combination identified by the unique combination of source endpoint, channel, and subconversation identifier associated with the selected messages. In block 607, the component invokes a create serial task component for the selected messages. For example, the component may have selected the messages of rows 508 and 510, which are associated with the conversation identified by channel 1, endpoint 2, and subconversation identifier 1. In this case, the create serial task component would be invoked for the conversation (1, 2, 1), which comprises the messages of rows 508 and 510. As another example, the component may have selected the messages of rows 514, 515, and 516, which are associated with the conversation identified by channel 2, endpoint 3, and subconversation identifier "serial." In this case, the create serial task component would be invoked for the conversation (2, 3, serial), which comprises the messages of rows 514, 515, and 516. The conversation lock is passed to the create serial task component, which unlocks the conversation when the task completes. Once a task or tasks have been created for the conversation, the component completes.

Figure 7:
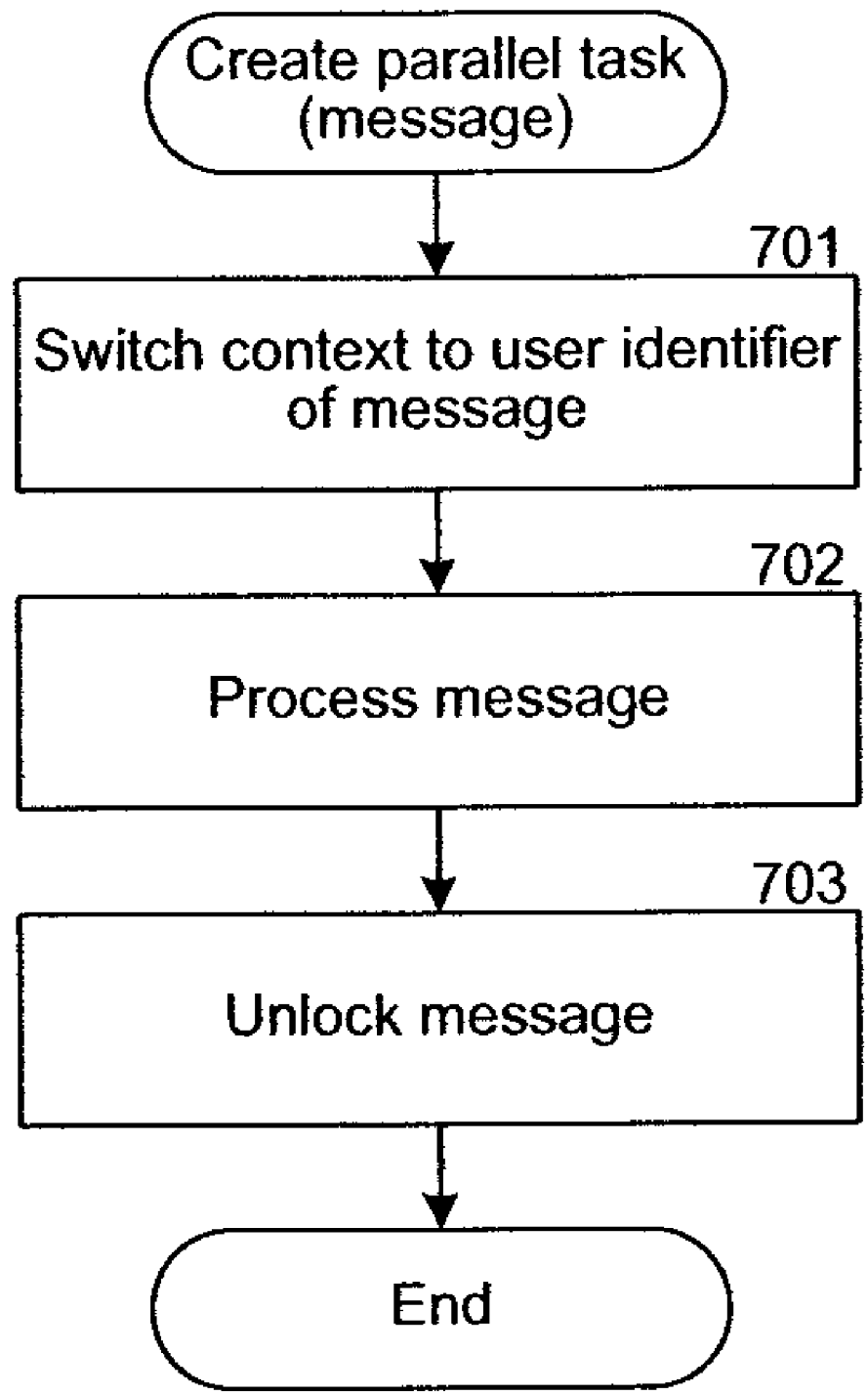
FIG. 7 is a flow diagram that illustrates the create parallel task component in some embodiments.

FIG. 7 is a flow diagram that illustrates the create parallel task component in some embodiments. The create parallel task component is passed an indication of a single message and creates a parallel task to process that message. In block 701, the component switches a processing context to match a user identifier associated with the message. Each message may be associated with a user identifier that indicates a user who created or transmitted the message. For security and other reasons, the component processes messages according to a processing context associated this user identifier. In block 702, the component processes the message. Once the message has completed, the component continues to block 703, where the component unlocks the message and completes. Once the message has been processed, the processing service deletes the message from the message queue—inbound or outbound—from which the message was processed.

Figure 8:
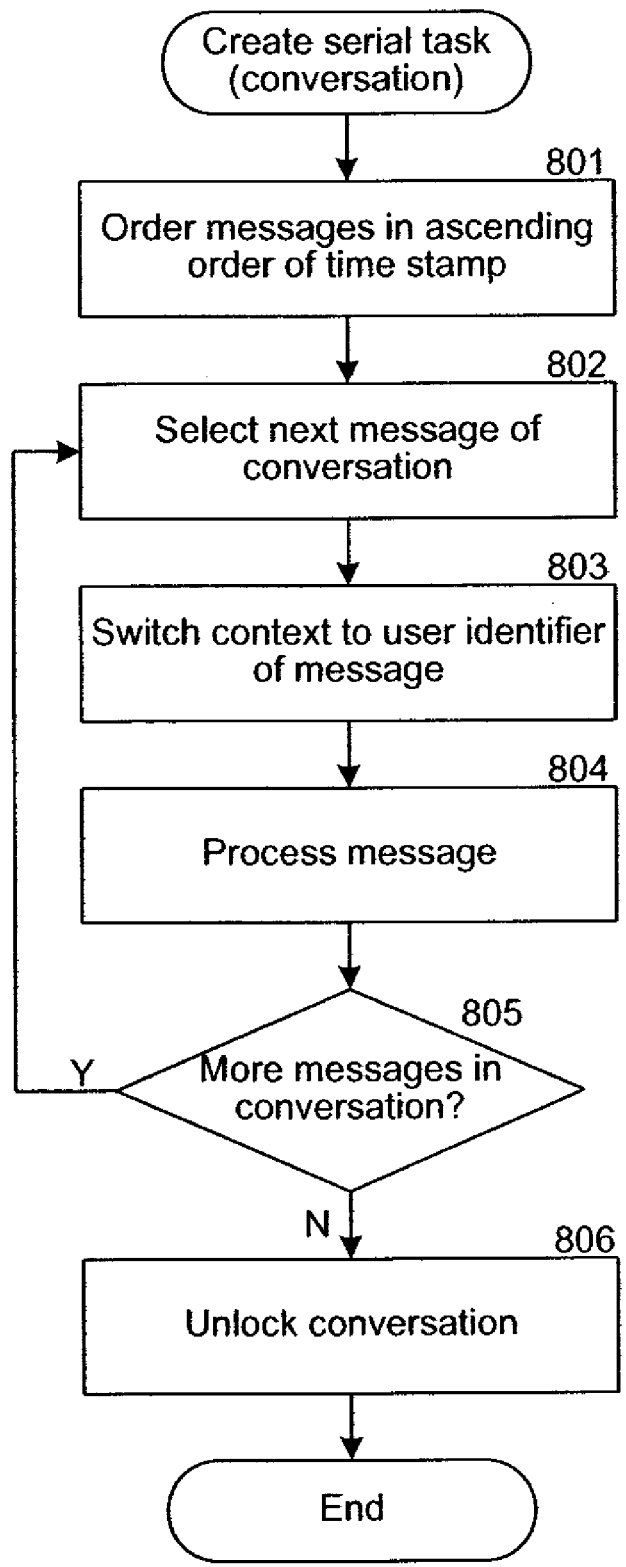
FIG. 8 is a flow diagram that illustrates the create serial task component in some embodiments.

FIG. 8 is a flow diagram that illustrates the create serial task component in some embodiments. The component is passed an indication of a conversation and creates a serial task to process the message(s) of that conversation. Each serial task may comprise one or more messages, and the messages of the task are to be processed serially. In block 801, the component orders the messages of the conversation in ascending order based on time stamps associated with the messages. For example, a time stamp may indicate the time a message was added to an inbound or outbound queue. Ordering messages in accordance with a time stamp ensures that messages are processed after other messages, if any, on which the messages depend. For each of the selected messages, the component loops through blocks 802 through 805. In block 802, the component selects the next message of the conversation. In block 803, the component switches a processing context to match a user identifier associated with the message, as described above in reference to FIG. 7. In block 804, the component processes the message, and then continues to decision block 805, where the component determines whether additional messages of the conversation remain to be processed. If there are additional messages, the component returns to block 802 where the next message of the conversation is selected, else the component continues to block 806, where the component unlocks the conversation and completes. Once the message has been processed, the processing service deletes the message from the message queue—inbound or outbound—from which the message was processed.

Figure 9:
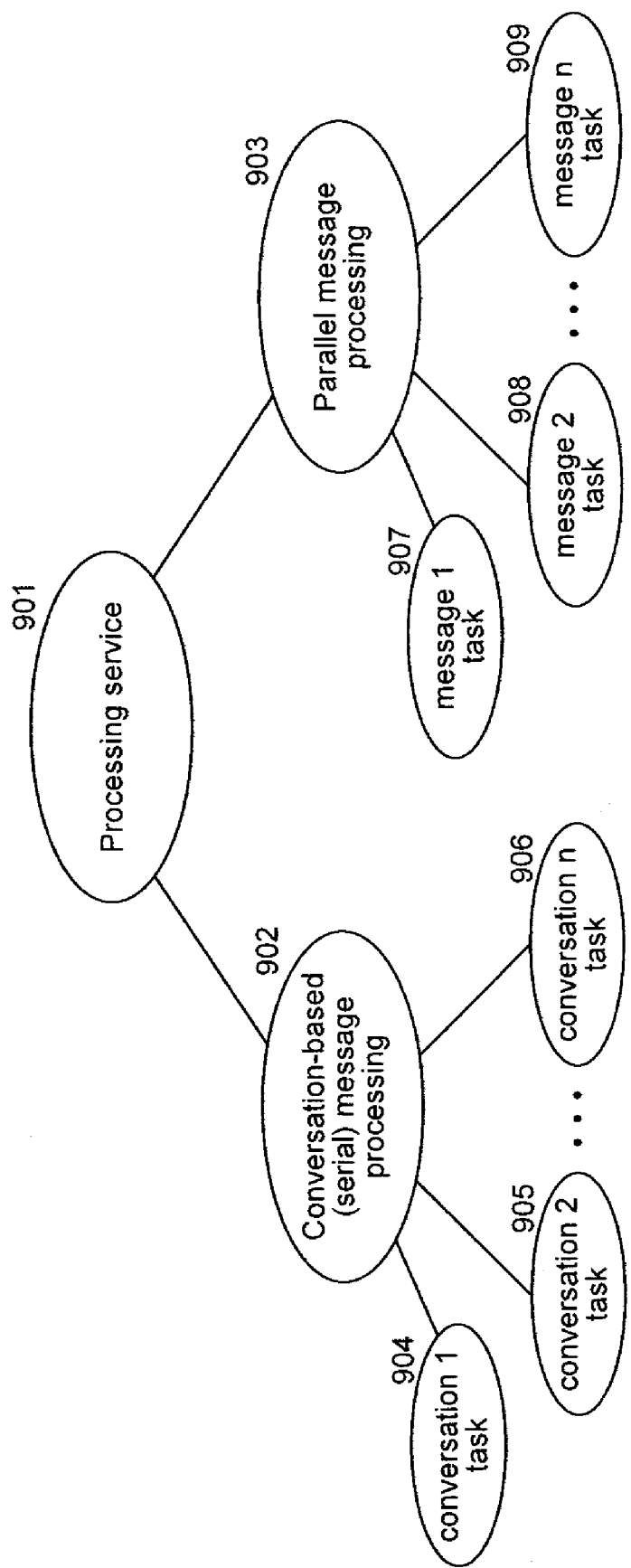
FIG. 9 is a block diagram that illustrates the creation of serial and parallel tasks in some embodiments.

FIG. 9 is a block diagram that illustrates the creation of serial and parallel tasks in some embodiments. Each time a snapshot of a message queue (whether an inbound message queue or an outbound message queue) is processed, a processing service 901 generates two jobs—a serial message processing job 902 for processing serial tasks and a parallel processing job 903 for processing parallel tasks. The serial message processing job 902 includes a task for each conversation; each conversation includes one or more messages that are to be processed in serial. These tasks include conversation 1 904, conversation 2 905, through conversation n 906. Each of the tasks of the serial message processing job may be processed in parallel. The parallel message processing job 903 includes a task for each message that is to be processed in parallel with other tasks. These tasks include message 1 907, message 2 908, and message n 909. So, the parallel tasks may be created by the parallel processing job and the serial tasks may be created by the serial processing job.

Figure 10:
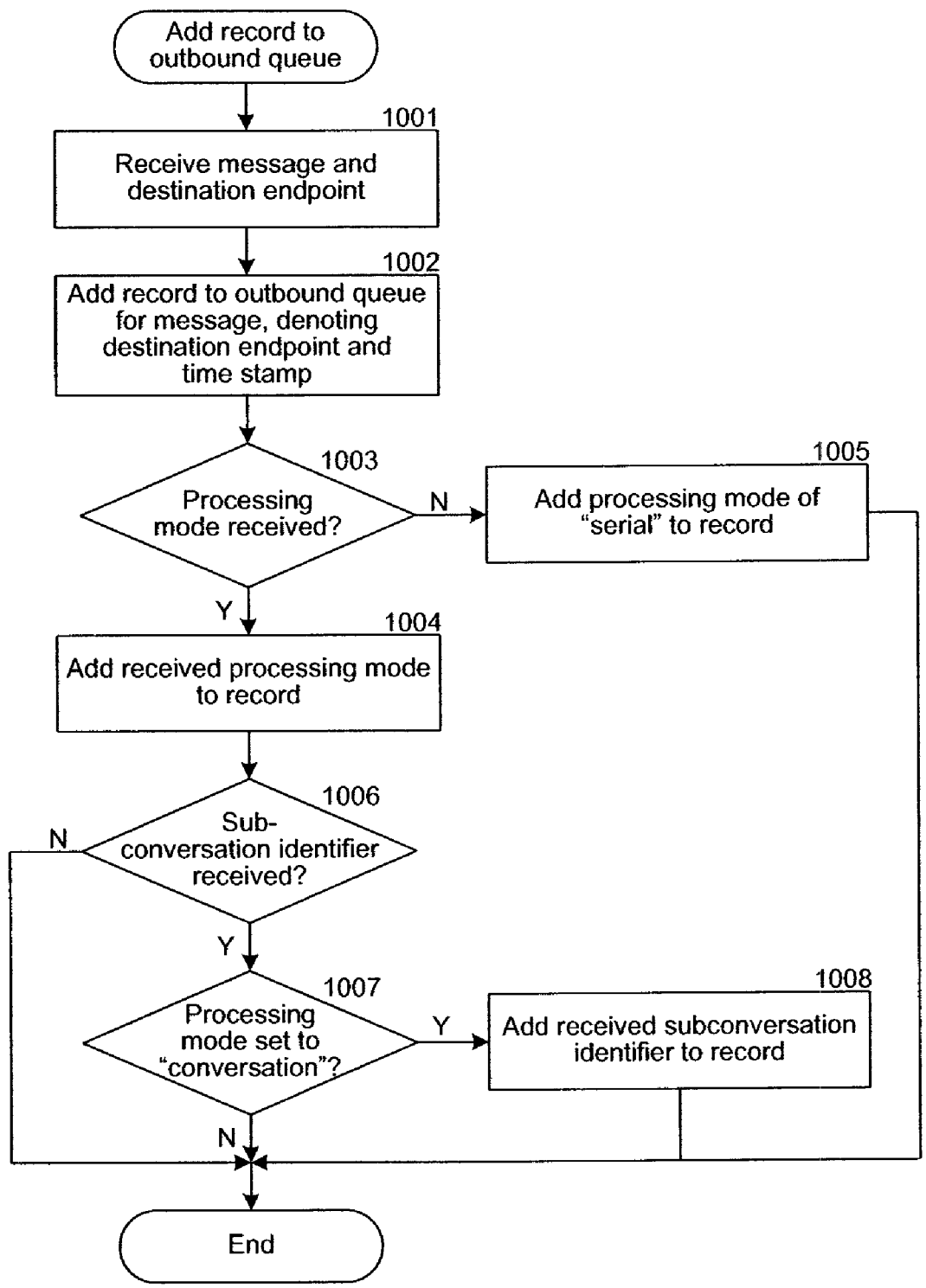
FIG. 10 is a flow diagram that illustrates a process that is used by the ERP system to add messages to an outbound queue in some embodiments.

FIG. 10 is a flow diagram that illustrates a process that is used by the ERP system to add messages to an outbound queue in some embodiments. The ERP system may generate messages to be transmitted to one or more destination endpoints. As these messages are generated, they are added to the outbound message queue for processing, and subsequent transmission to the destination endpoint(s). In block 1001, the process receives a message generated by the ERP system, including a destination endpoint to which the message is to be transmitted. In block 1002, the process adds a record to the outbound queue for the generated message, denoting the destination endpoint, the message contents, and a time stamp associated with the message. In other embodiments, each record may include more or less information associated with the message. In decision block 1003, the process determines whether it received from the ERP system an indication of a processing mode for the message. A processing mode designates whether a message is to be processed in serial, in parallel with other messages, or according to conversations. Processing mode indications may include "serial," "parallel," "conversation," and other processing modes. If a processing mode has been received for the message, processing continues to block 1004 where the designated processing mode is added to the record, else the process continues to block 1005 where a processing mode of "serial" is added to the record. Serial processing is the default processing mode to be used when no processing mode has been designated for a message. A default processing mode of "serial" ensures that messages are processed in order, in case subsequently generated messages depend on previously generated messages. Returning to block 1004, after a received processing mode has been added to the record, the process continues to decision block 1006, where the process determines whether it received from the ERP system a subconversation identifier for the message. If a subconversation identifier has been received, the process continues to decision block 1007, where the process determines whether the received processing mode for the message is "conversation," indicating that the message is to be processed in accordance with a conversation. As described above, other processing modes may include "serial" and "parallel." If the designated mode for the message is "conversation," the process continues to block 1008, where the process adds the received subconversation identifier to the record, else processing completes without adding a subconversation identifier to the record.

Figure 11:
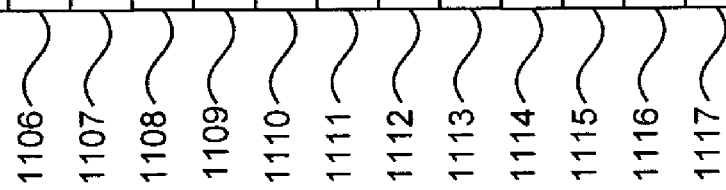
FIG. 11 is a block diagram that illustrates a snapshot of an outbound message queue that may be obtained by the process outbound queue component.

Periodically, such as at a given time interval or when a predetermined number of messages have been added to the outbound message queue, the processing service invokes the process outbound queue component of the processing service to process the messages in the outbound queue. In some embodiments, processing of the process outbound queue component is similar to the processing of the process inbound queue component. Accordingly, the process outbound queue component will be described in reference to FIG. 4. In block 401, the component gets a snapshot of the outbound message queue of the ERP system. FIG. 11 is a block diagram of a snapshot of an outbound message queue that may be obtained by the component. Column 1101 contains the destination endpoint to which each message is to be transmitted; column 1102 contains the subconversation identifier, if any, associated with each message; column 1103 contains the contents of each message; column 1104 contains a time stamp associated with each message; and column 1105 contains an indication of the processing mode designated for each message. Rows 1106-1117 contain records of the snapshot. In some embodiments, each of the messages in the outbound queue is transmitted via the same channel, regardless of the destination endpoint to which the message is to be transmitted. In such embodiments, records in the outbound queue need not denote the channel through which the message will be transmitted. Alternatively or additionally, the processing service may be channel agnostic, not caring about the channel via which the message is sent. In such embodiments, records in the outbound queue similarly need not denote the channel through which the message will be transmitted. One skilled in the art will appreciate, however, that outbound messages may be transmitted via multiple channels, and that records may accordingly denote the channel through which each message is to be transmitted.

Returning to FIG. 4, once the process outbound queue component has obtained a snapshot of the outbound message queue, for each conversation that is identified by a unique combination of a destination endpoint and a subconversation identifier, the component loops through blocks 402 through 406. (Note that, in the embodiments described above, because each outbound message is processed via the same channel, or because each outbound message can be processed via any channel, the unique combination identified by the conversation need not include a designation of the channel.) In block 402, the component selects records from the snapshot that are associated with the same conversation, as identified by the same destination endpoint and subconversation identifier. For example, the component may select the records comprising rows 1111 and 1112, which are associated with the conversation identified by endpoint 1 and subconversation identifier 1. In block 403, the component invokes a create outbound task component for the selected records. For example, the component may invoke the create outbound task for the records comprising rows 1111 and 1112. In decision block 404, the component determines whether the create outbound task component successfully created a task for the selected records. If a task was successfully created, the component continues to block 405 where the selected records are removed from the snapshot, else the component continues to decision block 406. In decision block 406, the component determines whether additional records remain in the snapshot of the outbound message queue. If additional records remain, the component returns to block 402, where additional records are selected, else the component continues to block 407 where the component waits before returning to block 401 to take another snapshot of the outbound message queue. As described above, the component may wait for a given time period or until a predetermined number of messages have been added to the outbound message queue before taking another snapshot.

In some embodiments, processing of the create outbound task component of the processing service is similar to the processing of the create inbound task component. Accordingly, the processing of the create outbound task component will be described in reference to FIG. 6. As described above, the component is passed an indication of a conversation and creates either a serial task or one or more parallel tasks to process the messages of that conversation. In decision block 601, rather than determining whether the messages have a subconversation identifier of "parallel" as in the create inbound task component, the create outbound task component determines whether the messages have a processing mode of "parallel." For example, the component may have selected the messages of rows 1108 and 1110, which are associated with the conversation identified by endpoint 2 and no conversation identifier (or a "null" conversation identifier), and which have a processing mode of "parallel." If the processing mode of the selected messages is "parallel," the component continues to block 602, where the component determines whether each of the messages is locked. As described above, locking a message ensures that multiple tasks are not processing a message at the same time. If a message is locked, the component returns a failure, indicating that it could not create a task for the message. If the message is not locked, the component continues to decision block 603, where the component locks the message. In block 604, the component invokes the create parallel task component for each message. That is, the create parallel task component would be invoked for each of the message of row 1108 and the message of row 1110. The create parallel task component is described above, in reference to FIG. 7. The message lock is passed to the create parallel task component, which unlocks the message when the task completes.

Alternatively, if at decision block 601, the component determines that the selected messages do not have a processing mode of "parallel" (e.g., the selected records have a processing mode of "serial" or "conversation"), the component continues to block 605, where the component determines whether the conversation identified by the unique combination of destination endpoint and subconversation identifier associated with the selected messages is locked. As described above, locking a conversation ensures that multiple tasks are not processing messages of the same conversation at the same time. If the conversation is locked, the component returns a failure, indicating that it could not create a task for the conversation. If the conversation is not locked, the component continues to block 606 where the component locks the conversation identified by the unique combination identified by the destination endpoint and subconversation identifier associated with the selected messages. In block 607, the component invokes the create serial task component for the selected messages. For example, the component may have selected the messages rows 1113 and 1116, which are associated with the conversation identified by endpoint 2 and subconversation identifier 1, and which have a processing mode of "conversation." In this case, the create serial task component would be invoked for the conversation (2, 1), which comprises the messages of rows 1113 and 1116. As another example, the component may have selected the messages of rows 1106 and 1107, which are associated with the conversation identified by endpoint 1 and a "null" conversation identifier, and which have a processing mode of "serial." In this case, the create serial task component would be invoked for the conversation (1, null), which comprises the messages of rows 1106 and 1107. The create serial task component is described above, in reference to FIG. 8. The conversation lock is passed to the create serial task component, which unlocks the conversation when the task completes. Once a task or tasks have been created for the conversation, the component completes.

In some embodiments, as described above, each message is associated with a user identifier that indicates a user who created or transmitted the message. For example, multiple clerks may generate sales orders that are transmitted to the ERP system. FIG. 12 is a block diagram that illustrates a snapshot of a message queue in which records include a user identifier. Column 1201 contains the channel through which each message was transmitted; column 1202 contains the source endpoint from which each message was transmitted; column 1203 contains the subconversation identifier associated with each message; column 1204 contains the user identifier associated with each message; column 1205 contains the contents of each message; column 1206 contains a time stamp associated with each message; and column 1207 contains an indication of the conversation associated with each message. Rows 1208 through 1215 each comprise a record of the message queue.

Returning to FIG. 8, recall that each time a message of a serial task is processed, for security and other reasons, the create serial task component switches a processing context to match a user identifier associated with the message. This is an expensive process, and its usage can be reduced by switching the processing context only when necessary, i.e., when the user identifier associated with a message is different from the user identifier associated with the previously processed message.

Figure 13:
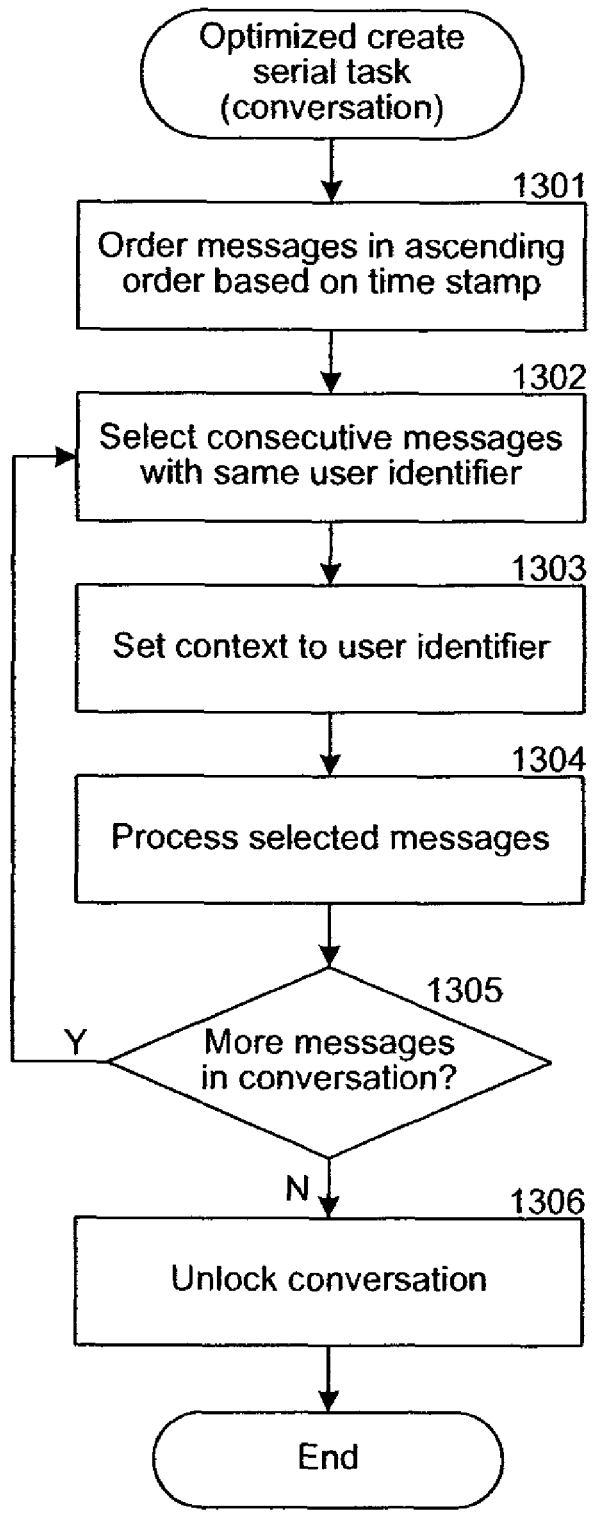
FIG. 13 is a flow diagram that illustrates an optimized version of the create serial task component of the processing service in some embodiments.

FIG. 13 is a flow diagram that illustrates an optimized version of the create serial task component of the processing service in some embodiments. In block 1301, the component orders the messages in ascending order based on time stamps associated with the messages. For example, a time stamp may indicate the time a message was added to an inbound or outbound queue. As described above, ordering messages in accordance with a time stamp ensures that messages that should be processed prior to other messages will be so processed. For each group of consecutive messages with the same user identifier, the component loops through blocks 1302 through 1305. In block 1302, the component selects consecutive messages that have the same user identifier. For example, the component may select the messages comprising rows 1208 and 1209 of FIG. 12. In block 1303, the component sets the processing context to the user identifier associated with the consecutive messages. For example, the component may set the processing context to match "user 1." In block 1304, the component processes each of the selected consecutive messages according to the processing context. For example, the component may process the messages of rows 1208 and 1209 without switching the processing context between messages. In other words, the processing context need not be switched each time a new message is processed, as long as the user identifier of the message matches the user identifier of a previously processed message. In decision block 1305, the component determines whether additional messages remain in the conversation to be processed. If additional messages remain, the component returns to block 1302 where another group of consecutive messages is selected. One skilled in the art will appreciate that a group of consecutive messages may include a single message, i.e., if the message does not have the same user identifier as the previous message or the subsequent message. Once all messages of the conversation have completed, the component continues to block 1306, where the component unlocks the conversation and completes.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of processing messages in an enterprise resource planning system, the method comprising:
generating a snapshot of a message queue of the enterprise resource planning system, wherein the message queue comprises a plurality of messages to be processed, each message having an associated conversation identified by a unique combination of an endpoint, a channel, and a subconversation identifier, the snapshot of the message queue having messages that are to be processed in serial and messages that are to be processed in parallel;
for each conversation identified by a unique combination of an endpoint, a channel, and a subconversation identifier associated with a message of the snapshot,
selecting from the snapshot messages that are associated with the same conversation identified by the unique combination of the endpoint, the channel, and the subconversation identifier,
determining whether the selected messages are to be processed in serial or in parallel based on the subconversation identifier of the conversation,
when it is determined that the selected messages are to be processed in serial, creating a task for the selected messages, the task for processing the selected messages serially, and
when it is determined that the selected messages are to be processed in parallel, creating a task for each of the selected messages; and
executing each of the created tasks, so that the selected messages of each created task are processed serially by that task, while each created task is executed in parallel with the other created tasks.

2. The method of claim 1 wherein the message queue is an inbound message queue.

3. The method of claim 1 wherein the message queue is an outbound message queue.

4. The method of claim 1 wherein creating the task includes:
   determining whether the conversation identified by the unique combination of the endpoint, the channel, and the subconversation identifier is locked;
   when it is determined that the conversation identified by the unique combination of the endpoint, the channel, and the subconversation identifier is locked, refraining from creating a task for the selected messages until the conversation is unlocked; and
   when it is determined that the conversation identified by the unique combination of the endpoint, the channel, and the subconversation identifier is not locked,
      locking the conversation, and
      creating a task for the selected messages.

5. The method of claim 4, further comprising, after a created task completes, unlocking the conversation associated with the messages of the created task.

6. The method of claim 1 wherein the subconversation identifier is a sequence of alphanumeric characters.

7. The method of claim 1 wherein the subconversation identifier is a flag.

8. The method of claim 1 wherein each message has an associated time stamp, and wherein the selected messages of the conversation are processed serially in order of their associated time stamps.

9. The method of claim 1 wherein, when it is determined that the selected messages are to be processed in parallel, creating the task for each of the selected messages comprises:
   determining whether the channel of the conversation is enabled for parallel processing;
   when it is determined that the channel of the conversation is enabled for parallel processing, creating a task for each of the selected messages, the tasks to be processed in parallel; and
   when it is determined that the channel of the conversation is not enabled for parallel processing, creating a task for the selected messages, the task for processing the selected messages serially.

10. A computer-readable medium that is not a signal having computer-executable instructions for implementing a method of processing messages in an enterprise resource planning system, the method comprising:
   receiving a snapshot of a message queue, wherein the message queue comprises a plurality of messages to be processed, each message having a conversation identified by a unique combination of an endpoint, a delivery channel, and a processing indicator, the processing indicator specifying whether a message is to be processed in serial or whether the message is to be processed in parallel the snapshot of the message queue having messages that are to be processed in serial and messages that are to be processed in parallel;
   for each conversation identified by a unique combination of an endpoint, a delivery channel, and a processing indicator of a message of the snapshot,
      selecting from the snapshot messages that have the same conversation identified by the unique combination of the endpoint, the delivery channel, and the processing indicator,
      determining whether the selected messages are to be processed in serial or in parallel, wherein the determination is based on the processing indicator of the conversation,
      when it is determined that the selected messages are to be processed in serial, creating a processing task for the selected messages, the processing task for processing the selected messages serially, and
      when it is determined that the selected messages are to be processed in parallel, creating a processing task for each of the selected messages; and
   executing each of the created processing tasks, so that the selected messages of each processing task are processed serially by that processing task, while each processing task is executed in parallel with the other processing tasks.

11. The computer-readable medium of claim 10 wherein creating the processing task includes:
   determining whether the conversation identified by the unique combination of the endpoint, the delivery channel, and the processing indicator is locked or unlocked;
   when it is determined that the conversation identified by the unique combination of the endpoint, the delivery channel, and the processing indicator is locked, refraining from creating a processing task for the selected messages until the conversation is unlocked; and
   when it is determined that the conversation identified by the unique combination of the endpoint, the delivery channel, and the processing indicator is unlocked,
      locking the conversation identified by the unique combination of the endpoint, the delivery channel, and the processing indicator, and
      creating a processing task for the selected messages.

12. The computer-readable medium of claim 11, further comprising, after a created processing task completes, unlocking the conversation identified by the unique combination of the endpoint, the delivery channel, and the processing indicator.

13. The computer-readable medium of claim 10 wherein each message has a user identifier, the user identifier indicating a user that created the message, and wherein executing a created processing task comprises:
   ordering the selected messages in ascending order based on a time stamp associated with each of the selected messages; and
   for each group of consecutive messages with the same user identifier,
      setting a processing context to the user identifier of the group of consecutive messages, and
      processing the group of consecutive messages according to the set processing context.

14. The computer-readable medium of claim 10 wherein the processing indicator is a symbol.

15. The computer-readable medium of claim 10 wherein the processing indicator is a string.

* * * * *